US012776739B2

(12) United States Patent
Sridhar et al.

(10) Patent No.: US 12,776,739 B2
(45) Date of Patent: Oct. 27, 2026

(54) POWER TOOL CONTROL FOR SHUTDOWN EVENT

(71) Applicant: MILWAUKEE ELECTRIC TOOL CORPORATION, Brookfield, WI (US)

(72) Inventors: Bharathi Sridhar, West Hartford, CT (US); Carter H. Ypma, Milwaukee, WI (US); Alejandro M. Damonte Vegas, Glendale, WI (US); Jasmine A Priatna, Chicago, IL (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/038,908

(22) Filed: Jan. 28, 2025

(65) Prior Publication Data

US 2025/0247036 A1 Jul. 31, 2025

Related U.S. Application Data

(60) Provisional application No. 63/627,179, filed on Jan. 31, 2024.

(51) Int. Cl.
*B25F 5/00* (2006.01)
*H02P 29/00* (2016.01)

(52) U.S. Cl.
CPC ............ *H02P 29/0027* (2013.01); *B25F 5/00* (2013.01)

(58) Field of Classification Search
CPC ............................... H02P 29/0027; B25F 5/00
USPC ..... 173/1–2, 13, 18–20, 184, 25–31, 38–39, 173/45–53
See application file for complete search history.

(56) References Cited

U.S. PATENT DOCUMENTS

| | | | | | |
|---|---|---|---|---|---|
| 5,914,882 | A * | 6/1999 | Yeghiazarians | F16P 3/00 | 706/900 |
| 7,497,272 | B2 * | 3/2009 | Strasser | B25D 16/006 | 173/4 |
| 8,587,231 | B2 * | 11/2013 | Pant | B25F 5/00 | 318/365 |
| 2005/0161241 | A1 * | 7/2005 | Frauhammer | B25F 5/026 | 173/1 |
| 2005/0247459 | A1 * | 11/2005 | Voigt | B25B 23/14 | 173/176 |
| 2010/0076474 | A1 * | 3/2010 | Yates | A61B 17/3205 | 606/139 |
| 2012/0080491 | A1 * | 4/2012 | Shelton, IV | A61B 17/07292 | 227/176.1 |
| 2012/0116379 | A1 * | 5/2012 | Yates | A61B 34/25 | 606/33 |
| 2012/0293103 | A1 * | 11/2012 | Forster | H01R 12/52 | 318/503 |

(Continued)

*Primary Examiner* — Robert F Long
(74) *Attorney, Agent, or Firm* — Michael Best & Friedrich LLP

(57) ABSTRACT

Systems and methods for controlling a power tool motor after a shutdown event. An example power tool includes a motor, a trigger, and a controller connected to the trigger and the motor. The controller is configured to provide, in response to actuation of the trigger, power to the motor at a first power level and initiate, based on a characteristic of the power tool, a shutdown event. The controller is configured to provide, in response to continued actuation of the trigger after the initiation of the shutdown event, power to the motor at a second power level, and brake, in response to the trigger no longer being actuated, the motor.

17 Claims, 4 Drawing Sheets

(56) References Cited

U.S. PATENT DOCUMENTS

| | | | | |
|---|---|---|---|---|
| 2013/0056235 | A1* | 3/2013 | Pozgay | H02P 7/29 173/29 |
| 2013/0098646 | A1* | 4/2013 | Funabashi | H01M 10/4207 429/61 |
| 2015/0272569 | A1* | 10/2015 | Leimbach | B25F 5/00 227/175.1 |
| 2016/0089757 | A1* | 3/2016 | Wirnitzer | B23Q 11/0092 173/2 |
| 2018/0021931 | A1* | 1/2018 | Abe | B25D 17/24 173/48 |
| 2018/0318999 | A1* | 11/2018 | Lovelass | B25B 23/147 |
| 2019/0217459 | A1* | 7/2019 | Gregorich | B23D 51/16 |
| 2020/0052696 | A1* | 2/2020 | Dey, IV | H02K 11/28 |
| 2021/0122017 | A1* | 4/2021 | Kelly | H05B 47/16 |
| 2021/0328399 | A1* | 10/2021 | Radtke | B25F 5/02 |
| 2022/0407274 | A1* | 12/2022 | Radtke | H01R 43/0486 |
| 2023/0234205 | A1* | 7/2023 | Abbott | H02K 11/21 |
| 2023/0293170 | A1* | 9/2023 | Shelton, IV | A61B 17/068 227/175.1 |
| 2024/0246215 | A1* | 7/2024 | Burnett | B25F 3/00 |
| 2025/0120695 | A1* | 4/2025 | Shelton, IV | A61B 90/98 |
| 2025/0160831 | A1* | 5/2025 | Leimbach | A61L 2/26 |

* cited by examiner

POWER TOOL CONTROL FOR SHUTDOWN EVENT

RELATED APPLICATIONS

This application claims the benefit of U.S. Provisional Patent Application No. 63/627,179, filed Jan. 31, 2024, the entire content of which is hereby incorporated by reference.

FIELD

Embodiments described herein provide systems and methods for controlling a power tool motor after a shutdown event.

SUMMARY

Power tools described herein include a motor, a trigger, and a controller connected to the trigger and the motor. The controller is configured to provide, in response to actuation of the trigger, power to the motor at a first power level and initiate, based on a characteristic of the power tool, a shutdown event. The controller is configured to provide, in response to continued actuation of the trigger after the initiation of the shutdown event, power to the motor at a second power level, and brake, in response to the trigger no longer being actuated, the motor.

In some aspects, the controller is further configured to increment, in response to continued actuation of the trigger after the initiation of the shutdown event, a counter, compare the counter to a counter threshold, and provide, in response to continued actuation of the trigger after the initiation of the shutdown event and in response to the counter being greater than or equal to the counter threshold, power to the motor at the second power level.

In some aspects, the power tool includes a sensor configured to sense movement of the power tool. The controller is further configured to determine, in response to continued actuation of the trigger after the initiation of the shutdown event and based on a signal from the sensor, whether movement of the power tool is greater than or equal to a movement threshold, and brake, in response to movement of the power tool being greater than or equal to the movement threshold, the motor.

In some aspects, the controller is further configured to provide, in response to movement of the power tool being less than the movement threshold, power to the motor at the second power level.

In some aspects, when providing power to the motor at the first power level, the controller is configured to continuously drive the motor, and when providing power to the motor at the second power level, the controller is configured to pulse the motor.

In some aspects, the power tool further includes an input device and the controller is further configured to receive, via the input device, a parameter associated with the second power level.

In some aspects, the power tool further includes an indicator and the controller is further configured to control, in response to the shutdown event, the indicator to provide an indication of the shutdown event.

In some aspects, the power tool further includes an indicator and the controller is further configured to control, in response to providing power to the motor at the second power level, the indicator to provide an indication of the shutdown event.

Methods for controlling a power tool described herein include providing, in response to actuation of a trigger, power to a motor at a first power level and initiating, based on a characteristic of the power tool, a shutdown event. The methods also include providing, in response to continued actuation of the trigger after the initiation of the shutdown event, power to the motor at a second power level, and braking, in response to the trigger no longer being actuated, the motor.

In some aspects, the method further includes incrementing, in response to continued actuation of the trigger after the initiation of the shutdown event, a counter, comparing the counter to a counter threshold, and providing, in response to continued actuation of the trigger after the initiation of the shutdown event and in response to the counter being greater than or equal to the counter threshold, power to the motor at the second power level.

In some aspects, the method further includes determining, in response to continued actuation of the trigger after the initiation of the shutdown event and based on a movement signal from a sensor, whether movement of the power tool is greater than or equal to a movement threshold, and braking, in response to the movement of the power tool being greater than or equal to the movement threshold, the motor.

In some aspects, the method further includes providing, in response to movement of the power tool being less than the movement threshold, power to the motor at the second power level.

In some aspects, the method further includes receiving, via an input device, a parameter associated with the second power level.

In some aspects, the method further includes controlling, in response to the shutdown event, an indicator to provide an indication of the shutdown event.

In some aspects, the method further includes controlling, in response to providing power to the motor at the second power level, an indicator to provide an indication of the shutdown event.

Power tools described herein include a motor, a trigger, and a controller connected to the trigger and the motor. The controller is configured to continuously provide, in response to actuation of the trigger, power to the motor, and initiate, based on a characteristic of the power tool, a shutdown event. The controller is configured to pulse, in response to continued actuation of the trigger after the initiation of the shutdown event, power to the motor using a reduced pulse width modulation (PWM) signal, and brake, in response to the trigger no longer being actuated, the motor.

In some aspects, the controller is further configured to increment, in response to continued actuation of the trigger after the initiation of the shutdown event, a counter, compare the counter to a counter threshold, and pulse, in response to continued actuation of the trigger after the initiation of the shutdown event and in response to the counter being greater than or equal to the counter threshold, power to the motor using the reduced PWM signal.

In some aspects, the power tool includes a sensor configured to sense movement of the power tool. The controller is further configured to determine, in response to continued actuation of the trigger after the initiation of the shutdown event and based on a signal from the sensor, whether movement of the power tool is greater than or equal to a movement threshold, and brake, in response to movement of the power tool being greater than or equal to the movement threshold, the motor.

In some aspects, the controller is further configured to pulse, in response to movement of the power tool being less than the movement threshold, power to the motor using the reduced PWM signal.

In some aspects, the power tool further includes an input device and the controller is further configured to receive, via the input device, a frequency of the reduced PWM signal.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other features and aspects will become apparent by consideration of the following detailed description and accompanying drawings.

DETAILED DESCRIPTION

Figure 1:
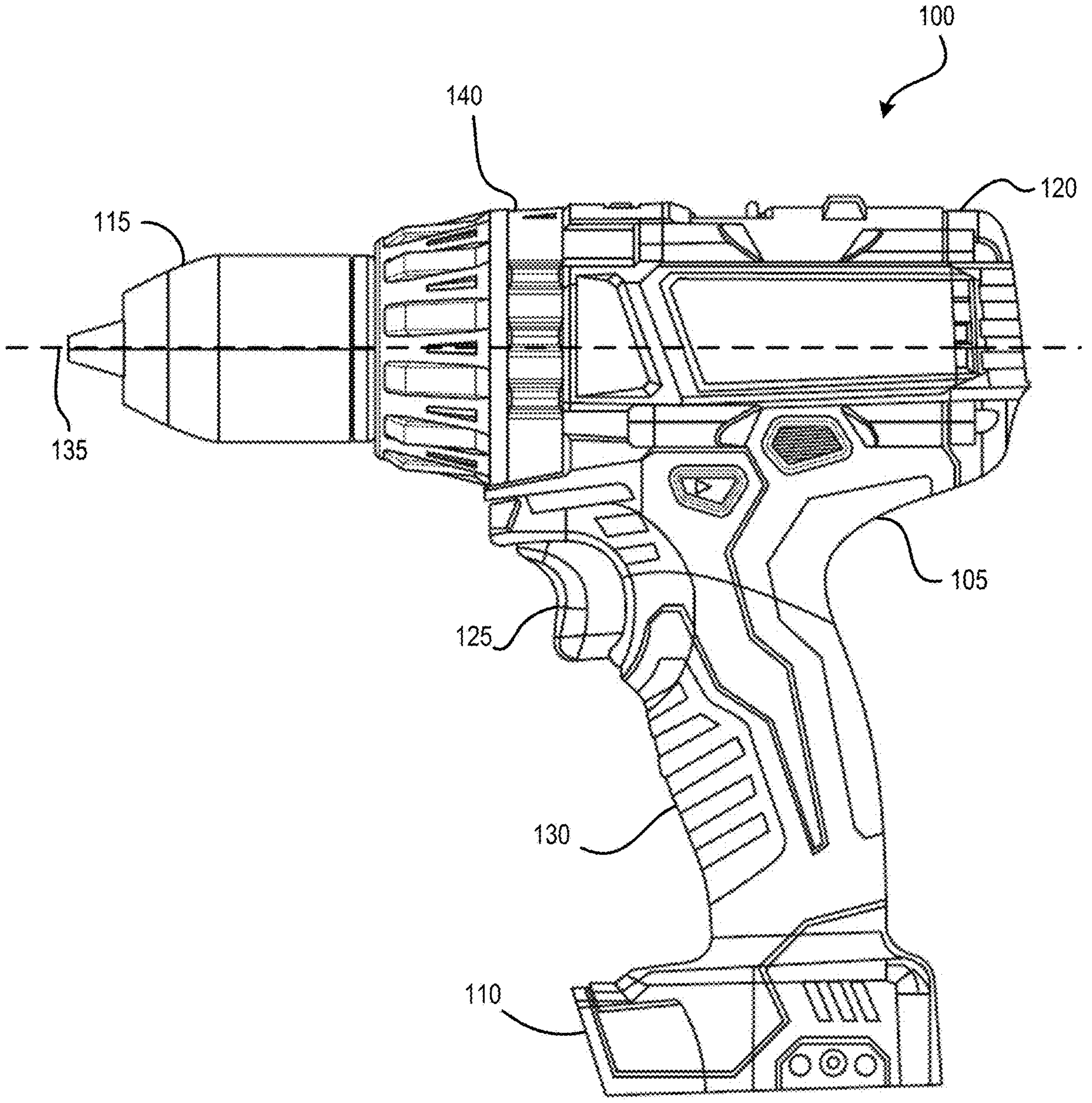
FIG. 1 illustrates a power tool in accordance with embodiments described herein.

FIG. 1 illustrates an example power tool 100, according to some embodiments. The power tool 100 includes a housing 105, a battery pack interface 110, a driver 115 (e.g., a chuck or bit holder), a motor housing 120, a trigger 125, a handle 130, and an input device 140. The motor housing 120 houses a motor 280 (see FIG. 2). A longitudinal axis 135 extends from the driver 115 through a rear of the motor housing 120. During operation, the driver 115 rotates about the longitudinal axis 135. The longitudinal axis 135 may be approximately perpendicular with the handle 130. While FIG. 1 illustrates a specific power tool 100 with a rotational output, it is contemplated that the methods described herein may be used with multiple types of power tools, such as drills, drivers, powered screw drivers, powered ratchets, grinders, right angle drills, rotary hammers, pipe threaders, or another type of power tool that experiences rotation about an axis (e.g., longitudinal axis 135). In some embodiments, the power tool 100 is a power tool that experiences a different type of movement, such as reciprocal saws, chainsaws, pole-saws, circular saws, cut-off saws, die-grinder, and table saws.

Figure 2:
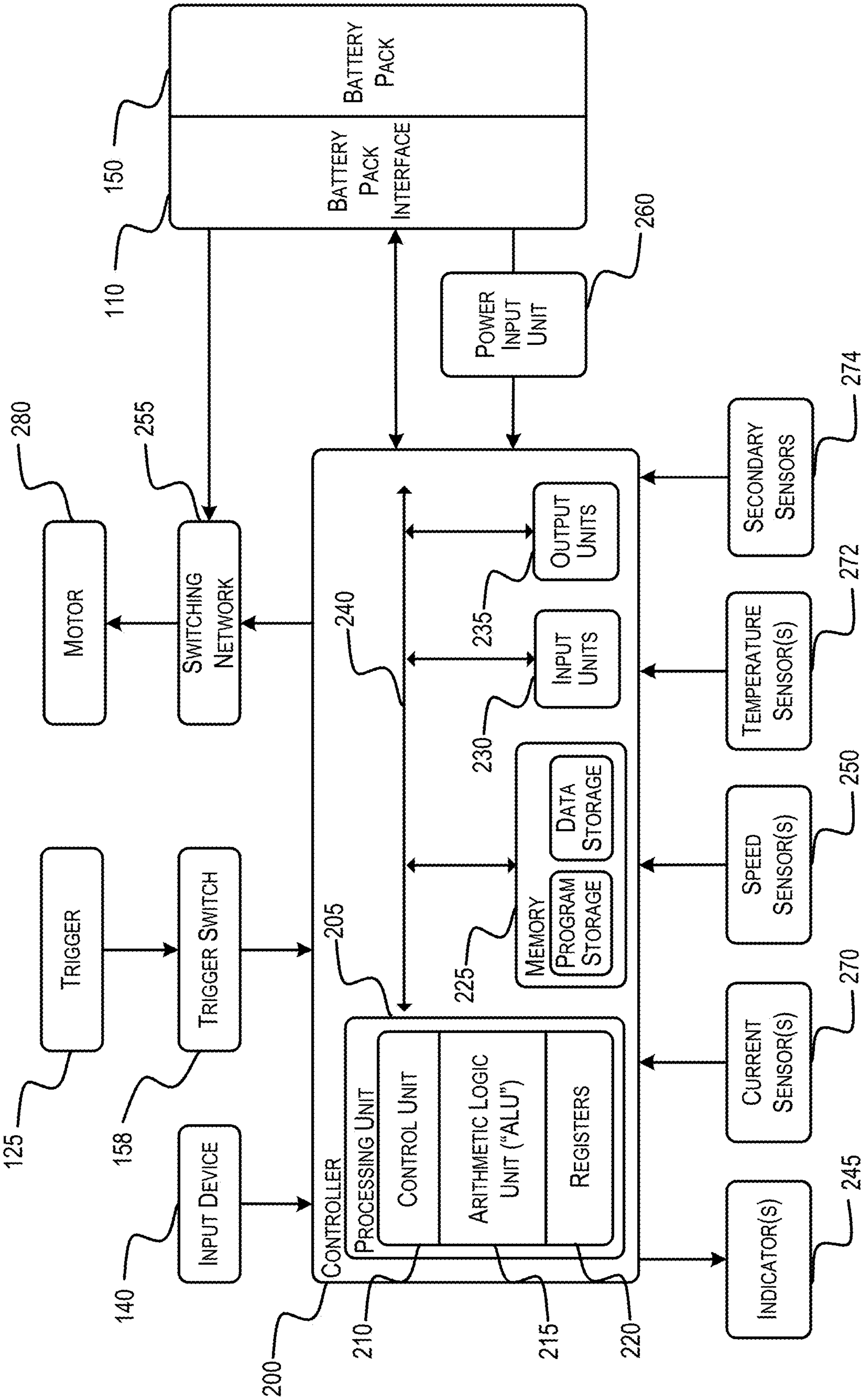
FIG. 2 illustrates a block diagram of a controller for the power tool of FIG. 1 in accordance with embodiments described herein.

A controller 200 for the power tool 100 is illustrated in FIG. 2. The controller 200 is electrically and/or communicatively connected to a variety of modules or components of the power tool 100. For example, the illustrated controller 200 is connected to indicators 245, a current sensor 270, a speed sensor 250, a temperature sensor 272, secondary sensor(s) 274 (e.g., a voltage sensor, an accelerometer, a depth sensor, an in-line torque sensor, etc.), the trigger 125 (via a trigger switch 158), a power switching network 255, the input device 140, and a power input unit 260.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 280 to rotate the driver 115 in response to a user's actuation of the trigger 125. The driver 115 may be coupled to the motor 280 via an output shaft (not shown). Depression of the trigger 125 actuates a trigger switch 158, which outputs a signal to the controller 200 to drive the motor 280, and therefore the driver 115. In some embodiments, the controller 200 controls the power switching network 255 (e.g., a FET switching bridge) to drive the motor 280. For example, the power switching network 255 may include a plurality of high side switching elements (e.g., FETs) and a plurality of low side switching elements (e.g., FETs). The controller 200 may control each of the plurality of high side switching elements and the plurality of low side switching elements to drive each phase of the motor 280. For example, the power switching network 255 may be controlled to more quickly deaccelerate the motor 280. The power switching network 255 may be controlled using, for example, a pulse width modulation ("PWM") signal. In some embodiments, the controller 200 monitors a rotation of the motor 280 (e.g., a rotational rate of the motor 280, a velocity of the motor 280, a position of the motor 280, and the like) via the speed sensor 250. The motor 280 may be configured to drive a gearbox 285 (e.g., a mechanism). In some implementations, the controller 200 is configured to set a gear ratio of the gears within the gearbox 285.

The indicators 245 are also connected to the controller 200 and receive control signals from the controller 200 to turn on and off or otherwise convey information based on different states of the power tool 100. The indicators 245 include, for example, one or more light-emitting diodes (LEDs), or a display screen. The indicators 245 can be configured to display conditions of, or information associated with, the power tool 100. For example, the indicators 245 can display information relating to an operational state of the power tool 100, such as a mode or speed setting. The indicators 245 may also display information relating to a fault condition, or other abnormality of the power tool 100. In addition to or in place of visual indicators, the indicators 245 may also include a speaker or a tactile feedback mechanism to convey information to a user through audible or tactile outputs. The indicators 245 may also provide a sequence of indications or multiple, simultaneous indications. For example, one or more LEDs may be controlled to provide light in sequence, a single LED may be controlled to repeatedly turn on and off, a speaker may be controlled after a LED is controlled to provide an indication, a tone-vibration sequence may be performed by the indicators 245 (for example, a speaker is controlled prior to a tactile feedback mechanism being controlled), or the like. In some embodiments, the indicators 245 provide (for example, display) information related to a shutdown condition of the power tool 100, such as a braking operation, an auto-stop operation, or a clutch operation (e.g., an electronic clutch operation) of the controller 200. For example, one or more LEDs are activated when the controller 200 is performing a clutch operation. In some embodiments, the indicators 245 provide information related to a selected gear ratio of the gearbox 285. In some embodiments, the indicators 245 provide information related to a change in power level (for example, a transition to controlling the motor 280 at a second power level from a first power level, or a transition to controlling the motor 280 at a first power level to a second power level.

The battery pack interface 110 is connected to the controller 200 and is configured to couple with a battery pack 150. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 150. The battery pack interface 110 is coupled to the power input unit 260. The battery pack interface 110 transmits the power received from the battery pack 150 to the power input unit 260. The power input unit 260 includes active and/or passive components (e.g., voltage step-down controllers, voltage converters, rectifiers, filters, etc.) to regulate or control the power received through the battery pack interface 110 and to the controller 200. In some embodiments, the battery pack interface 110 is also coupled to the power switching network 255. The operation of the power switching network 255, as controlled by the controller 200, determines how power is supplied to the motor 280.

The current sensor 270 senses a current provided by the battery pack 150, a current associated with the motor 280, or a combination thereof. In some embodiments, the current sensor 270 senses at least one of the phase currents of the motor. The current sensor 270 may be, for example, an inline phase current sensor, a pulse-width-modulation-center-sampled inverter bus current sensor, or the like. The speed sensor 250 senses a speed of the motor 280. The speed sensor 250 may include, for example, one or more Hall effect sensors. In some embodiments, the temperature sensor 272 senses a temperature of the power switching network 255, the battery pack 150, the motor 280, the gearbox 285, or a combination thereof. The secondary sensors 274 include additional sensors for sensing conditions of the power tool 100, such as voltage sensors, depth sensors, motion sensors, acceleration sensors, orientation sensors, and the like. The voltage sensors may sense a voltage of the motor 280 or the battery pack 150. The depth sensors, motion sensors, acceleration sensors, and orientation sensors may detect movement and position of the power tool 100 (and, specifically, the housing 105).

The input device 140 is operably coupled to the controller 200 to, for example, select a forward mode of operation, a reverse mode of operation, a torque setting for the power tool 100, a gear ratio of the gearbox 285, and/or a speed setting for the power tool 100 (e.g., using torque and/or speed switches), etc. In some embodiments, the input device 140 includes a combination of digital and analog input or output devices required to achieve a desired level of operation for the power tool 100, such as one or more knobs, one or more dials, one or more switches, one or more buttons, etc. In other embodiments, the input device 140 is configured as a ring (e.g., a torque ring). In some embodiments, movement of the input device 140 sets a desired torque and/or desired a speed value at which to drive the motor 280. In some embodiments, movement of the input device 140 sets parameters related to a shutdown condition of the power tool 100.

In some instances, the controller 200 may determine to shut down the motor 280 during operation of the motor 280. For example, a protective operation may be performed that brakes the motor 280 in response to an operational characteristic of the power tool 100, or an electronic clutch operation may be performed while a user is driving the motor 280. As this shutdown event occurs while a user is actuating the trigger 125 to drive the motor 280, the shutdown event may interrupt the user while the user is driving a fastener, stopping driving of the motor 280 and leaving the fastener short of the desired depth. Embodiments described herein provide for continued operation of the motor 280 following the initiation of a shutdown event by the controller 200. For example, should a user continue to actuate the trigger 125 even after the shutdown event is initiated, the controller 200 may control the motor 280 at a reduced power mode to finish driving the fastener to the desired depth.

Figure 3A:
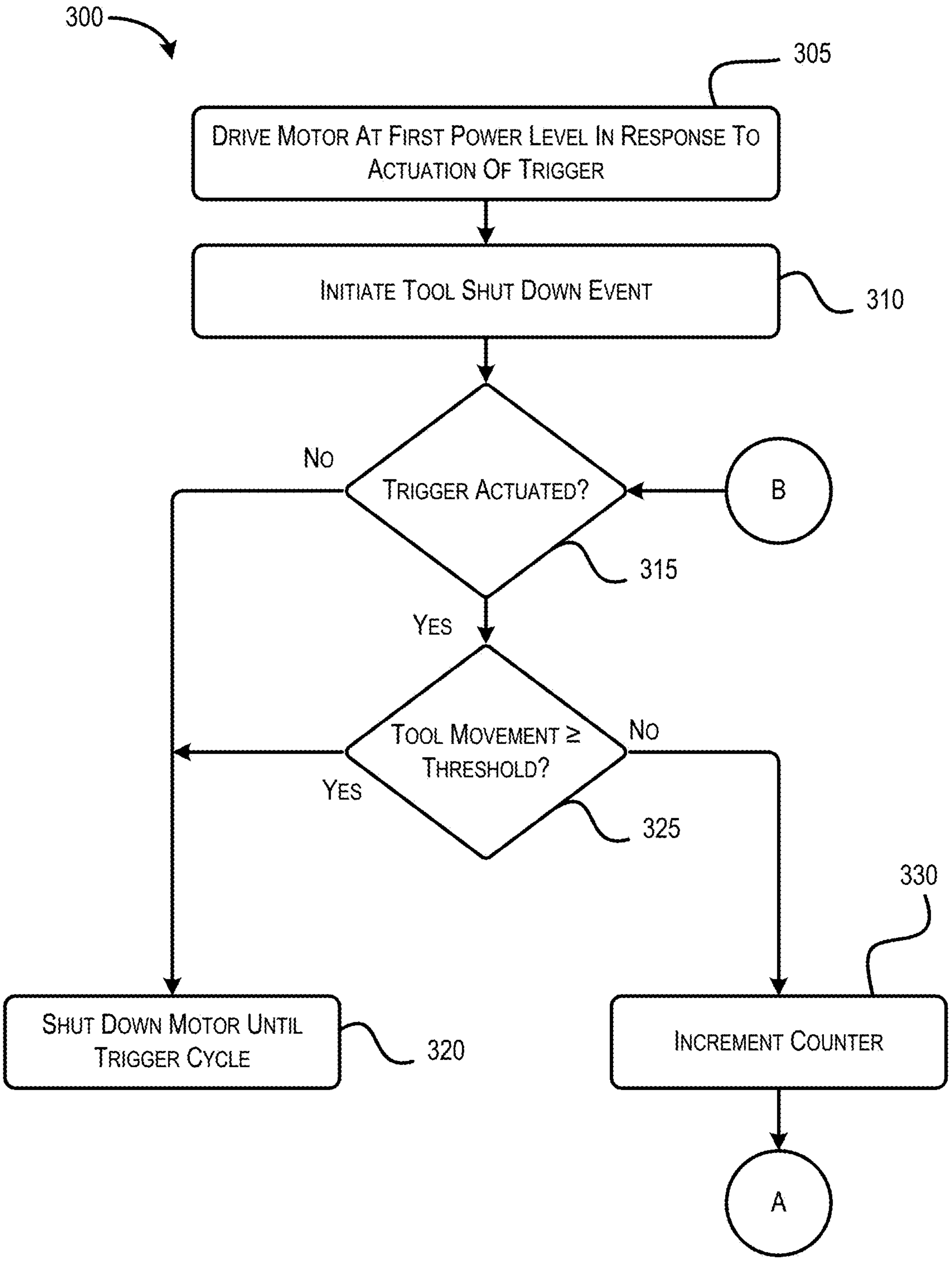
FIGS. 3A-3B illustrate a method performed by the controller of FIG. 2 in accordance with embodiments described herein.
Figure 3B:
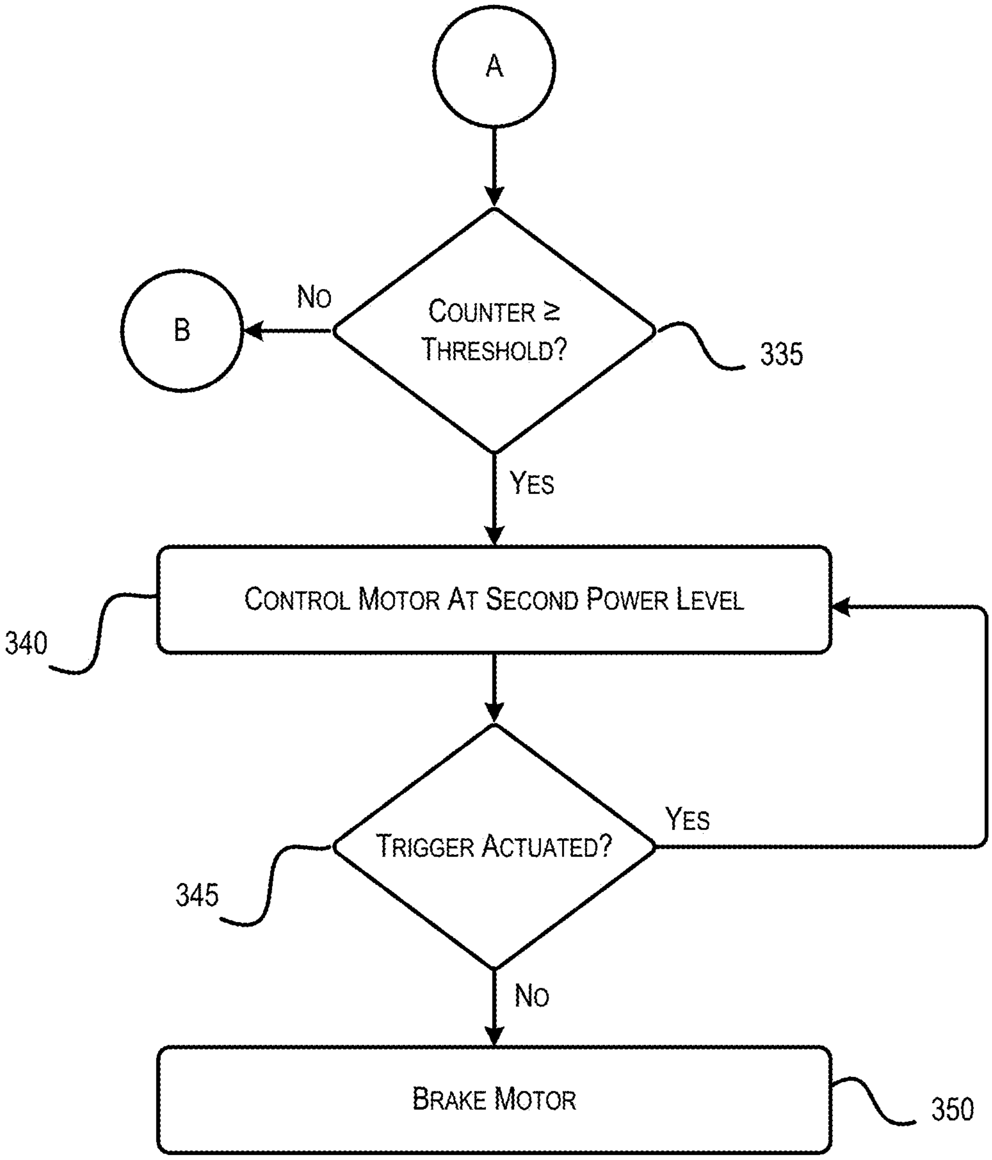

FIGS. 3A-3B illustrate a method 300 for controlling the motor 280. The method 300 may be performed by the controller 200. In some embodiments, fewer or additional steps may be provided than those illustrated. At block 305, the controller 200 drives the motor 280 at a first power level. For example, the controller 200 drives the motor 280 at a first power level while the trigger 125 is actuated. When controlling the motor 280 at the first power level, the controller 200 may control the motor 280 such that the motor 280 is continuously driven. In some embodiments, when controlling the motor 280 at the first power level, the controller 200 provides a first current to the motor 280.

At block 310, the controller 200 initiates a shutdown event based on a characteristic of the power tool 100. For example, the controller 200 may perform a protective operation to stop operation of the motor 280 via either braking or coasting. In another example, the controller 200 initiates an electronic clutch (e-clutch) operation. The characteristic of the power tool 100 may be, for example, a current of the motor 280, a current provided by the battery pack 150, a speed of the motor 280, a temperature of the power switching network 255, a temperature of the battery pack 150, a voltage of the motor 280, a voltage of the battery pack 150, a torque provided by the motor 280, or the like. In some implementations, the shutdown event is based on a combination of multiple characteristics of the power tool 100 or based on some calculation (e.g., processing) of the characteristic or characteristics of the power tool 100.

At block 315, the controller 200 determines whether the trigger 125 is still actuated (e.g., continued actuation) following initiation of the shutdown event. In some examples, the trigger 125 is not released following initiation of the shutdown event. An amount of actuation of the trigger 125 may be reduced without fully de-actuating the trigger 125. When the trigger 125 is not actuated ("NO" at block 315), the controller 200 proceeds to block 320 and shuts down the motor 280 until a trigger cycle (e.g., re-actuation of the trigger 125 after release of the trigger 125). For example, the controller 200 brakes the motor 280 and does not operate the motor 280 until the trigger cycle.

When the trigger 125 is actuated ("YES" at block 315), the controller 200 proceeds to block 325 and determines whether movement of the power tool 100 is greater than or equal to a movement threshold. For example, a depth sensor or motion sensor included in the secondary sensors 274 is used to determine whether the power tool 100 has moved significantly since initiation of the shutdown event at block 310 (e.g., indicating that the power tool 100 is no longer engaged with a workpiece). When movement of the power tool 100 is greater than or equal to the movement threshold ("YES" at block 325), the controller 200 proceeds to block 320 and shuts down the motor 280 until the trigger 125 is cycled. In this manner, should the tool move drastically after initiation of the shutdown event, the motor 280 is shutdown.

When movement of the power tool 100 is less than the movement threshold ("NO" at block 325), the controller 200 proceeds to block 330 and increments a counter. In some instances, block 325 is omitted from the method 300 and, when the trigger is actuated after initiation of the shutdown event (at block 315), the controller 200 proceeds directly to, for example, block 340.

At block 335, the controller 200 determines whether the counter is greater than or equal to a counter threshold. When the counter is less than the counter threshold ("NO" at block 335), the controller 200 returns to block 315 and determines whether the trigger 125 is still actuated. When the counter is greater than or equal to the counter threshold ("YES" at block 335), the controller 200 proceeds to block 340. By only proceeding when a counter is greater than or equal to a threshold, the controller 200 only continues controlling the motor 280 after initiating the shutdown event if a user actuates a trigger for a predetermined amount of time after the initiation of the shutdown event.

At block 340, the controller 200 controls the motor 280 at a second power level. In some embodiments, the second power level includes controlling the motor 280 at a reduced power compared to the first power level (e.g., at a reduced duty cycle, for a limited time, etc.). In some instances, when controlling the motor 280 at the second power level, the controller 200 pulses operation of the motor 280. For example, the motor 280 is pulsed using a reduced PWM signal, such as 50%, for a predetermined period of time. In some embodiments, the motor 280 may be controlled to be on for a first period of time (e.g., 10 milliseconds [ms]) and off for a second period of time (e.g., 10 ms). Other time periods can also be used, such as, for example, on for 50 ms and off for 50 ms, on for 100 ms and off for 100 ms, on for 100 ms and off for 50 ms, and the like.

In some embodiments, when controlling the motor 280 at the second power level, the controller 200 provides a second current to the motor 280 that is less than the first current. In some instances, the controller 200 controls the motor 280 at a reduced RPM when operating in the second power level when compared to the first power level. For example, when controlled at the second power level, the motor 280 may be controlled at a speed that is less than (e.g., 50%) of the speed of the motor 280 when controlled at the first power level.

In some embodiments, the controller 200 controls the motor 280 to drive the fastener a predetermined distance during each pulse of the motor 280. For example, the controller 200 may pulse the motor 280 to drive the fastener 0.5 millimeter (mm) per pulse, 1 mm per pulse, or the like.

At block 345, the controller 200 determines whether the trigger 125 continues to be actuated. When the trigger 125 continues to be actuated ("YES" at block 345), the controller 200 returns to block 340 and continues controlling the motor 280 at the second power level. When the trigger 125 is not actuated ("NO" at block 345), the controller 200 proceeds to block 350 and brakes the motor 280. For example, once the fastener is driven to the desired depth, the user releases the trigger 125 and operation of the motor 280 is stopped.

In some instances, when performing the method 300, the controller 200 controls the indicators 245 to indicate, for example, the initiation of the shutdown event (at block 310), that the motor 280 is controlled at a reduced power level (at block 345), and the like. In some instances, operation of the e-clutch is tied to the occurrence of the shutdown event. For example, when controlling the motor 280 at the second power level (at block 340), the controller 200 may increment or increase a e-clutch setting.

In some embodiments, when the trigger 125 is released while the tool movement is less than the movement threshold ("NO") at block 325, the controller 200 monitors for whether the trigger 125 is re-actuated. When the trigger 125 is re-actuated after release and the movement of the power tool 100 remains below the movement threshold, the controller 200 controls the motor 280 at the second power level (for example, proceeds to block 340). For example, while a user is fastening a fastener with the power tool 100, a protective operation shuts down the motor 280 and the user reacts by releasing the trigger 125. Without moving the power tool 100, the user re-actuates the trigger 125 on the same fastener. In response, the controller 200 controls the motor 280 at the second power level, allowing the user to complete the fastening operation.

In some instances, a user operates the input device 140 to adjust settings related to the shutdown event and control of the motor 280. For example, a user may set parameters related to the second power level, including a magnitude and/or a frequency of the PWM signal for controlling the motor, an on time and off time for pulsing the motor 280, and the like. Additionally, parameters of the second power level may be set for particular e-clutch settings. For example, higher e-clutch settings may include larger pulses (in magnitude and/or duration) of the motor 280, and lower e-clutch settings may include smaller pulses of the motor 280. In some embodiments, the magnitude and/or duration of the pulses is dependent on an amount of actuation of the trigger 125. For example, the second power level may include a larger magnitude and/or duration of current pulses when the trigger 125 is at a first position than when the trigger 125 is at a second, less-actuated position.

Thus, embodiments described herein provide, among other things, systems and methods for controlling a power tool motor after a shutdown event. Various features and advantages are set forth in the following claims.

What is claimed is:

1. A power tool comprising:
- a motor;
- a trigger; and
- a controller connected to the trigger and the motor, the controller configured to:
  - provide, in response to actuation of the trigger, power to the motor at a first power level,
  - initiate, based on a characteristic of the power tool, a shutdown event,
  - increment, in response to continued actuation of the trigger after the initiation of the shutdown event, a counter representative of elapsed time following initiation of the shutdown event,
  - compare the counter to a counter threshold, provide, in response to continued actuation of the trigger after the initiation of the shutdown event and in response to the counter being greater than or equal to the counter threshold, power to the motor at a second power level, and
  - brake, in response to the trigger no longer being actuated, the motor.

2. The power tool of claim 1, further comprising:
- a sensor configured to sense movement of the power tool, wherein the controller is further configured to:
  - determine, in response to continued actuation of the trigger after the initiation of the shutdown event and based on a signal from the sensor, whether movement of the power tool is greater than or equal to a movement threshold, and
  - brake, in response to movement of the power tool being greater than or equal to the movement threshold, the motor.

3. The power tool of claim 2, wherein the controller is further configured to:
- provide, in response to movement of the power tool being less than the movement threshold, power to the motor at the second power level.

4. The power tool of claim 1, wherein, when providing power to the motor at the first power level, the controller is configured to continuously drive the motor, and wherein, when providing power to the motor at the second power level, the controller is configured to pulse the motor.

5. The power tool of claim 1, further comprising:

an input device; and wherein the controller is further configured to:

receive, via the input device, a parameter associated with the second power level.

6. The power tool of claim 1, further comprising:

an indicator; and wherein the controller is further configured to:

control, in response to the shutdown event, the indicator to provide an indication of the shutdown event.

7. The power tool of claim 1, further comprising:

an indicator; and wherein the controller is further configured to:

control, in response to providing power to the motor at the second power level, the indicator to provide an indication of the shutdown event.

8. A method of controlling a power tool, the method comprising:

providing, in response to actuation of a trigger, power to a motor at a first power level;

initiating, based on a characteristic of the power tool, a shutdown event;

incrementing, in response to continued actuation of the trigger after the initiation of the shutdown event, a counter representative of elapsed time following initiation of the shutdown event, comparing the counter to a counter threshold, providing, in response to continued actuation of the trigger after the initiation of the shutdown event and in response to the counter being greater than or equal to the counter threshold, power to the motor at a second power level; and braking, in response to the trigger no longer being actuated, the motor.

9. The method of claim 8, further comprising:

determining, in response to continued actuation of the trigger after the initiation of the shutdown event and based on a movement signal from a sensor, whether movement of the power tool is greater than or equal to a movement threshold; and braking, in response to the movement of the power tool being greater than or equal to the movement threshold, the motor.

10. The method of claim 9, further comprising:

providing, in response to the movement of the power tool being less than the movement threshold, power to the motor at the second power level.

11. The method of claim 8, further comprising:

receiving, via an input device, a parameter associated with the second power level.

12. The method of claim 8, further comprising:

controlling, in response to the shutdown event, an indicator to provide an indication of the shutdown event.

13. The method of claim 8, further comprising:

controlling, in response to providing power to the motor at the second power level, an indicator to provide an indication of the shutdown event.

14. A power tool comprising:

a motor;

a trigger; and a controller connected to the trigger and the motor, the controller configured to:

continuously provide, in response to actuation of the trigger, power to the motor, initiate, based on a characteristic of the power tool, a shutdown event, increment, in response to continued actuation of the trigger after the initiation of the shutdown event, a counter representative of elapsed time following initiation of the shutdown event, compare the counter to a counter threshold, pulse, in response to continued actuation of the trigger after the initiation of the shutdown event and in response to the counter being greater than or equal to the counter threshold, power to the motor using a reduced pulse width modulation ("PWM") signal, and brake, in response to the trigger no longer being actuated, the motor.

15. The power tool of claim 14, further comprising:

a sensor configured to sense movement of the power tool, and wherein the controller is further configured to:

determine, in response to continued actuation of the trigger after the initiation of the shutdown event and based on a signal from the sensor, whether movement of the power tool is greater than or equal to a movement threshold, and brake, in response to movement of the power tool being greater than or equal to the movement threshold, the motor.

16. The power tool of claim 15, wherein the controller is further configured to:

pulse, in response to movement of the power tool being less than the movement threshold, power to the motor using the reduced PWM signal.

17. The power tool of claim 14, further comprising:

an input device; and wherein the controller is further configured to:

receive, via the input device, a frequency of the reduced PWM signal.

* * * * *